(12) United States Patent
Larsson et al.

(10) Patent No.: US 8,228,878 B2
(45) Date of Patent: Jul. 24, 2012

(54) METHOD AND SYSTEM OF COMMUNICATIONS

(75) Inventors: Peter Larsson, Solna (SE); Mikael Prytz, Rönninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 12/601,652

(22) PCT Filed: May 31, 2007

(86) PCT No.: PCT/SE2007/050390
§ 371 (c)(1),
(2), (4) Date: Apr. 28, 2010

(87) PCT Pub. No.: WO2008/147269
PCT Pub. Date: Dec. 4, 2008

(65) Prior Publication Data
US 2010/0214964 A1      Aug. 26, 2010

(51) Int. Cl.
*H04B 7/216* (2006.01)
(52) U.S. Cl. ...................................................... 370/335
(58) Field of Classification Search .......... 370/203–210, 370/328–339; 375/147–148; 455/13.3, 25, 455/63.4, 82, 83, 562.1, 575.7
See application file for complete search history.

(56) References Cited

U.S. PATENT DOCUMENTS

| 7,026,989 | B1 | 4/2006 | Minkoff et al. |
| 7,327,800 | B2 * | 2/2008 | Oprea et al. .................. 375/267 |
| 7,684,337 | B2 * | 3/2010 | Mehta et al. .................. 370/238 |
| 2006/0056338 | A1 * | 3/2006 | Abe et al. ...................... 370/328 |

FOREIGN PATENT DOCUMENTS

| EP | 1538762 A2 | 6/2005 |
| EP | 1615354 A2 | 1/2006 |

OTHER PUBLICATIONS

Slingsby, W. T. et al. "Antenna Isolation Measurements for On-Frequency Radio Repeaters," IEE Conference on Antennas and Propagation, Apr. 4-7, 1995, vol. 1, pp. 239-243.

* cited by examiner

*Primary Examiner* — Frank Duong
(74) *Attorney, Agent, or Firm* — Coats & Bennett, P.L.L.C.

(57) ABSTRACT

The present invention relates to wireless communications, and more specifically it relates to a method and system of relaying of wireless communications. Particularly, it relates to suppression and elimination of self-induced interference and oscillations in such systems, thereby facilitating repeaters with increased amplification gain providing extended communication range and improved performance in terms of data rates. Preferred embodiments specify antenna element weighting providing such interference suppression. The invention is, e.g., useful for spatial multiplexing and MIMO communications.

18 Claims, 13 Drawing Sheets

METHOD AND SYSTEM OF COMMUNICATIONS

TECHNICAL FIELD

The present invention relates to wireless communications, and more especially it relates to a method and system of relaying of wireless communications. Particularly, it relates to suppression and elimination of self-induced interference and oscillations in such systems.

BACKGROUND

Relaying of wireless communications is a well-known tool to extend transmission ranges and to cover holes in coverage patterns. In surface-covering systems another known means to achieve radio coverage of, e.g., holes in coverage patterns is to install a transmission site, e.g., a base station at essentially the same position as the relaying equipment. When it comes to range extending, an underlying problem is often how to bridge a transmission range comprising obstacles in the environment, such as mountains or high buildings. In such situations, known alternatives to a relay station is to increase antenna mast heights or change position of at least one of transmitting and receiving stations to avoid obstacles interrupting or affecting the transmission path and possibly achieve a line of sight connection. However, mountains and buildings can reach considerable heights and their extensions can be substantial.

In radio communications systems for mobile communications it is not unusual that various base stations are interconnected by means of radio wave links, thereby eliminating interconnection of the base stations by wire.

International Patent Application WO2006121381 describes a method and arrangement for a wireless communications network using relaying. Distributed delay diversity is achieved by each relaying node cyclically shifting OFDM symbols a particular number of symbols in a sequence of symbols. In the international patent application both regenerative and non-regenerative relaying are considered.

International Patent Application WO2005064872 reveals a method and system for a wireless communications network using cooperative relaying. Base stations adapt transmissions to relay stations based on reported soft associations and channel quality measures. The international patent application includes embodiments making use of MIMO (Multiple Input Multiple Output) communications in the various wireless communications links.

FIG. 1 illustrates schematically a cellular system using relaying according to prior art. The figure shows one cell <<205>> of a wireless network comprising a transmitting and receiving node in the form of an access point or base station <<210>>. The network also comprises a number of relaying nodes <<215>>, <<221>>, <<222>>. Connections are established between the access point or base station <<210>> and served nodes or user equipment <<220>> over the relaying nodes as appropriate. The served nodes or user equipment are subsequently referred to as user equipment for short. The user equipment may be, e.g., a mobile station, a personal computer comprising wireless communications equipment. The relay-station antennas can be mounted on, e.g., antenna-masts or rooftops. The actual station relaying communications between the access point or base station <<210>> and a particular example mobile station <<220>> may change during the communications session, e.g., due to the user of the mobile station carrying the mobile station around, or reflecting/blocking objects affecting the radio paths are moving.

The acronym MIMO is used in prior art to refer to both channel properties and diversity or multiplexing properties of communications. As regards the channel properties, the communications channel which is achieved by using transmit and receive antennas with multiple sending and receiving antenna elements, respectively, is called a MIMO channel. As regards diversity or multiplexing properties, there are particularly two aspects worth mentioning:

1. Spatial multiplexing and
2. Diversity coding.

In spatial multiplexing multiple lower rate data streams are, e.g., transmitted from different transmit antenna elements, normally in the same frequency channel. If these signals arrive at the receiver antenna with sufficiently different spatial signatures, the receiver can separate these streams, distinguishing the various data streams. The maximum number of spatial streams is limited by the lesser in the number of sending/receiving antenna elements at the transmitter or receiver.

Diversity coding is used, e.g., when the transmitter has no information on the transmission channel properties. In diversity coding methods, a data stream is coded using techpiques called space-time coding. The diversity coding exploits that signals of the various multiple antenna communication links are fading uncorrelated or independently. Diversity coding can be applied also when using spatial multiplexing.

In MIMO combining or multiplexing, it is particularly useful to incorporate information on the MIMO communications channel properties usually referred to as channel information. However, such channel information is not required when using diversity coding.

In communications it is since long well established practice to use a complex representation of signals, the magnitude and phase of which determines the magnitude of an in-phase component and a quadrature-phase component in a complex plane. The in-phase and quadrature-phase components represent a weighted sum of base functions. In this context orthogonal base functions over a symbol interval are preferred. Examples of such orthogonal base functions are sine and cosine waveforms.

It is convenient to represent multiple data streams using vector terminology and vector algebra. This is merely a simplified model of actual implementations to make understanding of the underlying principles easier and is not reducing the actual technology to mathematic theories. A concept well known from the vector algebra is the null space of an operator. The null space of an operator A is the set of all operands v which solve the equation Av=0. If the operator is a linear operator on a vector space, the null space is a linear subspace. The null space is then a vector space. If A is a matrix, the null space is a linear subspace of the space of all vectors. The dimension of this linear subspace is called the nullity of A. The rank-nullity theorem states that the rank of any matrix plus its nullity equals the number of columns of that matrix.

The null space of A can be used to find and express all solutions (the complete solution) of the equation Ax=b. If $x_1$ solves this equation it is called a particular solution. The complete solution representing all possible solutions of the equation is equal to the particular solution added to any vectors from the null space.

FIG. 2 illustrates schematically example relaying comprising cooperative relaying for communications from a casting entity <<TX>> to a capturing entity <<RX>>. Communications are distributed along two routes 1 and 2. Route 1 comprises two wireless hops <<1a>>, <<1b>> and includes a relay station 1 <<RS$_1$>>. Correspondingly, route 2 comprises two wireless hops <<2a>>, <<2b>> and includes a relay station 2 <<RS$_2$>>.

U.S. Patent Application US20050014464 relates to wireless networks using relaying. Forwarding, at a relay station, of signals from a first link between a transmitter and the relay station is adapted as a response to estimated radio channel characteristics of at least the first link. The U.S. Patent Application includes embodiments with relay stations with multiple antennas in each relay station.

3$^{rd}$ Generation Partnership Project (3GPP): *Technical Specification Group Radio Access Networks, Universal Terrestrial Radio Access (UTRA) repeater planning guidelines and system analysis (Release 6)*, 3GPP TR 25.956 V6.0.0, France, December 2004, describes planning guidelines and system scenarios for UTRA repeaters. In addition, it also contains simulations and analysis of the usage of repeaters in UMTS networks. Section 5.1.1. discusses antenna isolation. As a repeater amplifies a received signal, it can act as an oscillator under certain circumstances. The feedback path in this oscillating amplifier system is established through the two antennas of the repeater: coverage antenna and donor antenna. According to the 3GPP technical specification, the optimum in order to minimize the risk of oscillations is a combination of donor and coverage antennas that are mounted the way that there is a null in the antenna pattern in the direction pointing towards the other antenna. A null means minimum antenna gain in the specified direction.

As both antennas are usually mounted in opposite directions, it is useful to choose both donor and coverage antenna types that have a high front-to-back ratio.

Typical antennas that are used for repeater sites have a narrower aperture in the vertical antenna pattern. The vertical distance of the antenna influences the isolation of the antenna system. In a typical configuration, when both antennas are mounted on a pole, there is a null in the antenna pattern pointing vertically up and down from the antenna's feeding point. If there is a horizontal separation between the antennas, additional lobes in the vertical antenna pattern have to be taken into account.

Reflection and attenuation properties of all materials near the antenna can influence the antenna isolation of a repeater drastically.

Waves transmitted by antennas are reflected by surfaces, depending on the materials. If there is a reflection from a building towards a pole with the mounted antennas, this can decrease the antenna isolation by more than 10 dB.

The material of an antenna tower itself has also an effect on the isolation: If both antennas are mounted on a tower made of concrete, this improves the antenna isolation, as signals are attenuated and reflected by the material of the tower. A steel grid tower however might not increase antenna isolation particularly, as the distances between the single elements in the tower might be bigger than half a wavelength, which means that radiated power can pass the tower almost unattenuated. In this case, antenna isolation is more dependent on the antenna patterns.

Shielding grids mounted near the antennas also have an effect on the isolation. Generally, isolation can be improved by approximately 5 dB using a shielding grid. This depends on the shape of the shielding grid. Grids that are shaped according to the antenna outlook are better than simple ones.

Section 5.1.4 considers repeater delay. The UTRA BS and UEs can handle a 20 µs time delay between two paths (c.f. TS 25.101 and TS 25.104). The repeater introduces a time delay of 5-6 µs. The signal paths introduced through the repeater will be longer than the direct path, both due to the extra traveling distance required for the signal (approximately 5 µs per 1.5 km) and due to the group delay in the repeater itself. For outdoor repeater coverage, where the areas can be substantial, it is a rule of thumb that the repeater site should be placed between the repeater service area and the donor base station.

Section 5.2 concerns coexistence of two or more uncoordinated operators. Consider a base station BSA and BSB of operators A and B, respectively, and user equipment UEA and UEB connected to operator A and B, respectively. In the case where a repeater is installed in the vicinity of a base station operating on the adjacent channel the required isolation between base station B and the repeater's donor port will depend on the up-link gain. Anyone can imagine that a signal transmission from UEB propagating towards BSB can take two routes to BSB—directly or via repeater A of operator A—both of which routes may comprise multi-paths. In the 3GPP technical specification, it is assumed that the path through the repeater will be badly distorted, since the delay spread in the adjacent carrier frequencies are bound to be substantial. As a consequence, the signal traveled through the repeater is considered to be interference only. However, this interference will have a fixed relation to the signal power from UEB arriving in BSB since it follows the power control applied from BSB on UEB. In the 3GPP technical specification, this phenomenon is denoted self-interference.

SsIR (Signal to self-Interference Ratio) is the relation between the power level of the distorted UEB signal from the repeater A path and the undistorted signal arriving directly from the UE, taken on the BSB receiver terminal. The effect of putting the SsIR to 0 dB is that a UEB with this SsIR occupies twice the air interface capacity from BSB as required from a UE with infinite SsIR utilizing the same service, resulting in a minimum requirement for the isolation between the repeater A donor port and the base station B receive port.

*RA2/Private Business Systems Unit, Radiocommunications Agency*, Wyndham House, 189 Marsh Wall, London, E14 9SX, 'RA269,' July 1999, published on the Internet, discusses the concept of on-frequency repeaters. An on-frequency repeater, OFR, is considered to be a device that receives an RF (radio frequency) signal and re-transmits or re-radiates it on the same frequency without any significant delay.

OFRs can re-transmit or re-radiate unwanted signals as well as wanted signals, and so cause interference. Additionally, because of the nature of their operation, OFRs are prone to instability. If they are not site engineered with a high degree of care, oscillation may occur and lead to serious interference to the licensee and other users of the radio spectrum.

U.S. Patent Application US20020045431 describes variable gain control in an on-frequency repeater. A narrowband detector is adapted to detect respective RF signals within each of a first and second wideband signal paths. Finally, the micro controller operates to control each of the AGC (Automatic Gain Control) blocks using the detected RF signals. A slaved variable gain amplifier of one wideband signal path is arranged to selectively amplify RF signals in the respective wideband signal path based on a signal power of RF signals in the other wideband path. The repeater comprises a directional donor unit and a subscriber coverage unit. The directions donor unit operates to establish and maintain a network link between the repeater and the base station. The transmit and receive performance of the directional donor unit enable maintenance of the network link with the base station even when the directional donor unit is located well beyond the conventional cell and/or network coverage area boundary. A feedback path within the uplink AGC closes the control loop of the AGC and limits system oscillation by automatically adjusting gain of the variable gain amplifier in the event of inadequate isolation between the directional donor antenna and the subscriber coverage antenna.

U.S. Patent Application US20050232194 also describes variable gain control in an on-frequency repeater. A narrowband signal within a broadband RF signal is identified and isolated. The isolated narrowband signal is then processed to detect repeating features of the narrowband signal, thereby recognizing and identifying the signal type. System gain of the on-frequency repeater can be controlled based on the power level of the identified narrowband signal.

FIG. 3 illustrates schematically coverage areas <<S1>>, <<S2>>, <<S3>> and <<Coverage Area>> of three sectors of a base station <<BTS>> and a repeater station <<RS>>. The repeater station <<RS>> is equipped with an antenna <<Donor Antenna>> directed towards the base station <<BTS>>, and an antenna <<Coverage Antenna>> providing radio coverage in the area <<Coverage Area>> served by the repeater station.

The donor and coverage antennas are transmitter and receiver antennas, respectively, in uplink direction. In downlink direction the donor and coverage antennas are receiver and transmitter antennas, respectively.

Andrew Corporation: Bulletin BR-101111.1-EN (04/06), 2006, promotes a repeater for on-frequency operations. The repeater comprises automatic feedback interference cancellation, canceling at least partially from a composed input signal a feedback component of the input signal that is fed back to the repeater input from the repeater output signal. In the bulletin, the automatic interference cancellation equipment, ICE, is claimed to be capable of 35 dB enhancement of antenna isolation. Output to input isolation in the range of 95 dB (including ICE enhancement) is mentioned for a repeater providing a link gain of approximately 80 dB. An output to input isolation 15 dB greater than the gain provided is a common requirement for this kind of repeaters.

The repeater described in Bulletin BR-101111.1-EN is an example of a fairly traditional cancellation of signals interfering with desired signals at the input of a receiver. J. Chun, J. Lee, P. Choi, J. C. Yun, S. J. Lee, J. H. Lee, '*Smart Antennas for the On-Air On-Frequency Repeater in the* 3G *Mobile Communication Applications,*' *Proceedings of SPIE* Vol. 4474, 2001, pp. 376-383, presents a beamforming algorithm that can be used for an on-air on-frequency repeater in an attempt to solve a well-known problem of LCMV (Linear Constrained Minimum Variance) beamformers suppressing the desired signal. The authors reveal an on-frequency repeater comprising a plurality of donor antenna elements for making a fixed highly directive beam on the donor side, meanwhile limiting the signal power from the serving side due to the coverage pattern of the donor antenna, unless there are reflecting objects introducing interfering signal components from the serving side in a direction of the donor antenna's radiation beam pattern.

International Patent Application WO2005062427, relates to high data rate communications, and more especially to line of sight, LOS, multiple input multiple output, MIMO, communications links and antenna configuration for LOS MIMO links, particularly radio links and optical wireless links.

Matti Latva-aho, 'Advanced receivers for wideband CDMA systems,' Department of Electrical Engineering, University of Oulu, Finland 1999, considers advanced receiver structures capable of suppressing multiple-access interference in code-division multiple-access (CDMA) systems operating in frequency-selective fading channels. Linear minimum mean squared error, LMMSE, receivers are derived and analyzed in frequency-selective fading channels. Different versions of the LMMSE receivers are concluded to be suitable for different data rates.

None of the cited documents above discloses a method and system of interference mitigation for a repeater station suppressing potentially interfering output signal components of the repeater station such that they do not reach the signal input of the repeater station.

SUMMARY

Path losses in the range of 120-130 dB for radio communication paths in public wireless communication systems are not unusual. For a repeater to bridge the entire path loss and a 15 dB greater output to input isolation, output to input isolation in the range of 135-145 dB is required.

On-frequency repeaters, OFRs, have an advantage of avoiding resulting throughput loss that may arise in many existing relay stations where the node forwarding data or signals cannot receive and transmit at the same time on the same frequency. This loss is also referred to as duplex loss.

Another advantage of OFRs is their feature of not requiring additional frequency spectrum.

As already mentioned, example drawbacks of prior art OFRs are their sensitivity to interference fed back from their transmitting side to receiving side, feed-back interference, and the risk of introducing interference in frequency bands adjacent to their operating frequency band.

Another drawback is that the interference level due to feed-back interference limits the maximum path loss that can be bridged or overcome by the repeater.

A problem of prior art on-frequency repeaters is that the gain and coverage range is limited due to interference signals arriving at the input from the output of the repeater limiting available maximum gain.

Further, a problem of prior art OFRs applying multiple antenna elements is that existing solutions reduce the rank to 1 of the end-to-end communications channel from/to, e.g., a base station to/from user equipment.

For supporting MIMO over a communications link, a rank greater than 1 is required for the communications link.

It is, consequently, an object of preferred embodiments of the invention to provide a method and system for active suppression of signal feedback from a transmitting side to a receiving side of a repeater.

Another object of preferred embodiments of the invention is to provide higher gain than prior art solutions and thereby increase communication range.

A further object of preferred embodiments of the invention is to provide a method and system for active control of both maximum gain in the main direction of an antenna beam and maximum suppression in direction from the transmitting antenna to the receiving antenna of the repeater station.

It is also an object of embodiments of the invention to facilitate on-frequency repeaters providing multi-antenna communications channel of rank greater than 1.

Finally, it is an object of embodiments of the invention to facilitate MIMO communications with on-frequency repeaters.

These objects are met by a method and system of interference mitigation for a repeater station suppressing potentially interfering signal components from a signal output connection of the repeater station such that they do not reach a signal input connection of the repeater station, of which the input signal is to be repeated, the method and system comprising weighting in magnitude and/or delay of signals received from or distributed to at least either of a receiver and a transmitter antenna, comprising a plurality of antenna elements, of the repeater station.

Preferred embodiments of the invention, by way of examples, are described with reference to the accompanying drawings below.

DETAILED DESCRIPTION

Figure 1:
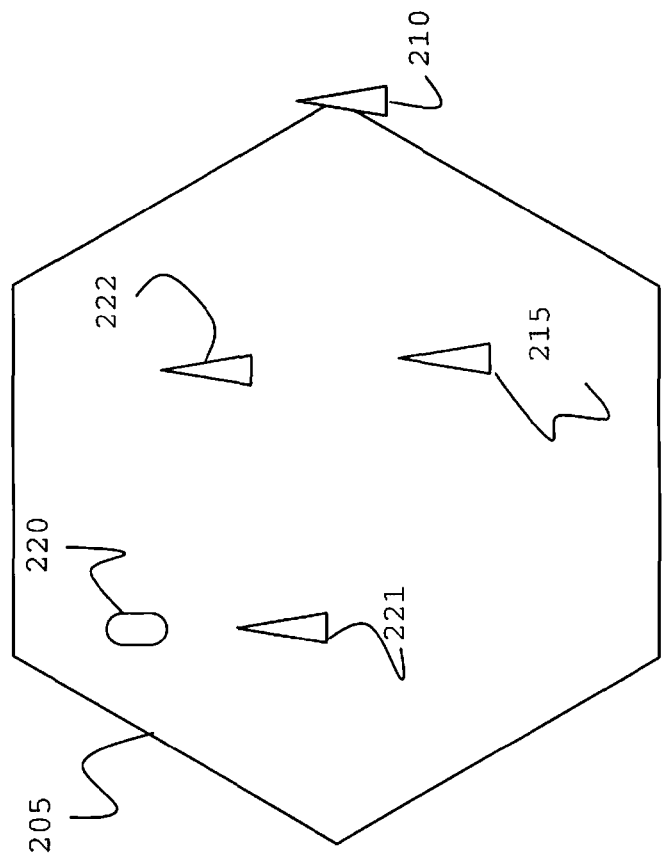
FIG. 1 illustrates schematically a cellular system using relaying according to prior art.
Figure 2:
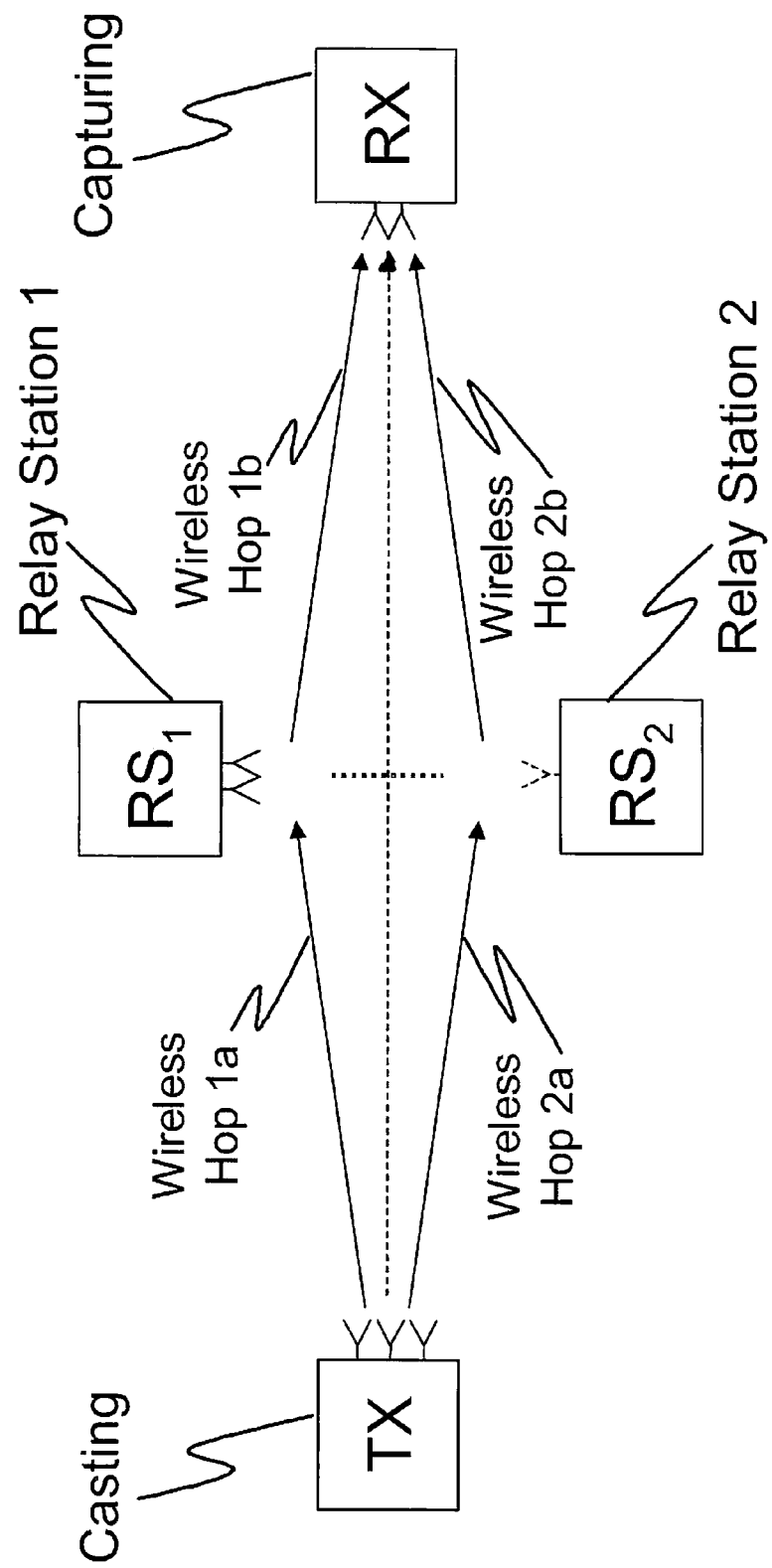
FIG. 2 illustrates schematically example relaying comprising cooperative relaying for communications from a casting entity <<TX>> to a capturing entity <<RX>>.
Figure 3:
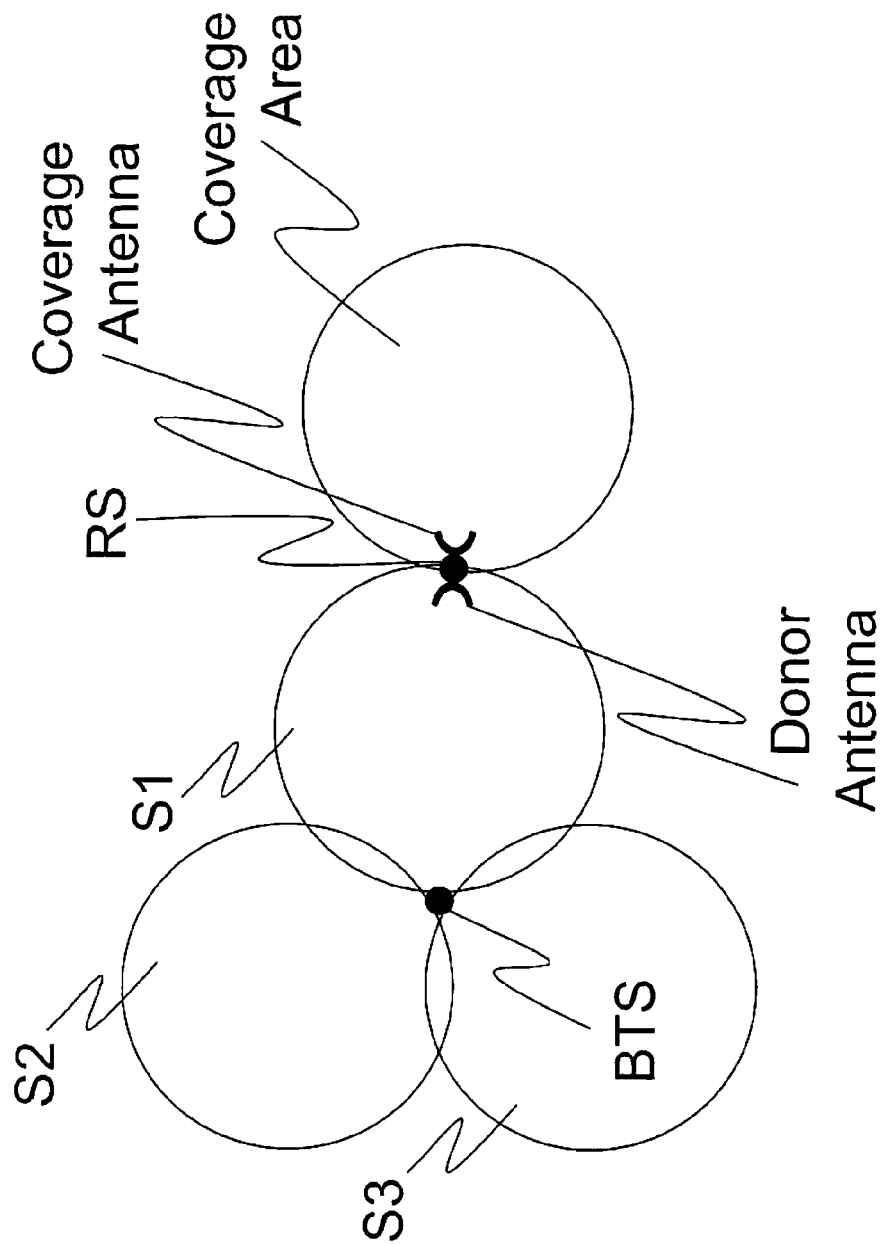
FIG. 3 illustrates schematically coverage areas of a prior art system with a base station with three sectors and a repeater station with donor and coverage antennas.

In the following description, for purpose of explanation, specific details are set forth such as particular architectures, interfaces, techniques, etc. in order to provide a thorough understanding of the present invention. However, it will be apparent to those skilled in the art that the present invention may be practiced in other embodiments that depart from these specific details.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention describes a method and system of providing improved output to input isolation of repeater stations. In this sense, a repeater station is virtually any station or equipment forwarding a received signal, the forwarded signal usually being transmitted at a higher energy or power level than the energy or power level of the received signal to be forwarded. The invention considers suppression and elimination of output to input interference and oscillations in such systems, thereby facilitating repeater improvements such as increased amplification gain and providing extended communication range and improved performance in terms of data rates.

The invention is applicable to single relay links or relay chains but also to cooperative relaying, combining in parallel multiple communications links or chains comprising one or more repeaters. The invention is applicable to relaying involving two hops (transmitter→relay station and relay station→receiver) and also to relaying involving more than two hops (for n hops: transmitter→relay station 1, relay station 1→relay station 2, . . . , relay station n−2→relay station n−1, relay station n−1→receiver).

A preferred repeater station is an on-frequency repeater.

On-frequency repeaters, OFRs, have an advantage of avoiding resulting throughput loss that may arise in many schemes where the node forwarding data or signal cannot receive and transmit at the same time on the same frequency. Such a loss is also referred to as duplex loss.

A first embodiment of the invention is a repeater comprising one or more donor antennas with multiple antenna elements and one or more coverage antennas with multiple antenna elements. Further, in the first embodiment a channel matrix incorporating transmission properties from the at least one transmitting antenna to the at least one receiving antenna of the repeater station, each antenna comprising two or more antenna elements. The channel matrix represents the (transformed) channel impulse response from each antenna element of the repeater-station transmitter-antenna to each antenna element of the repeater-station receiver-antenna.

Figure 4:
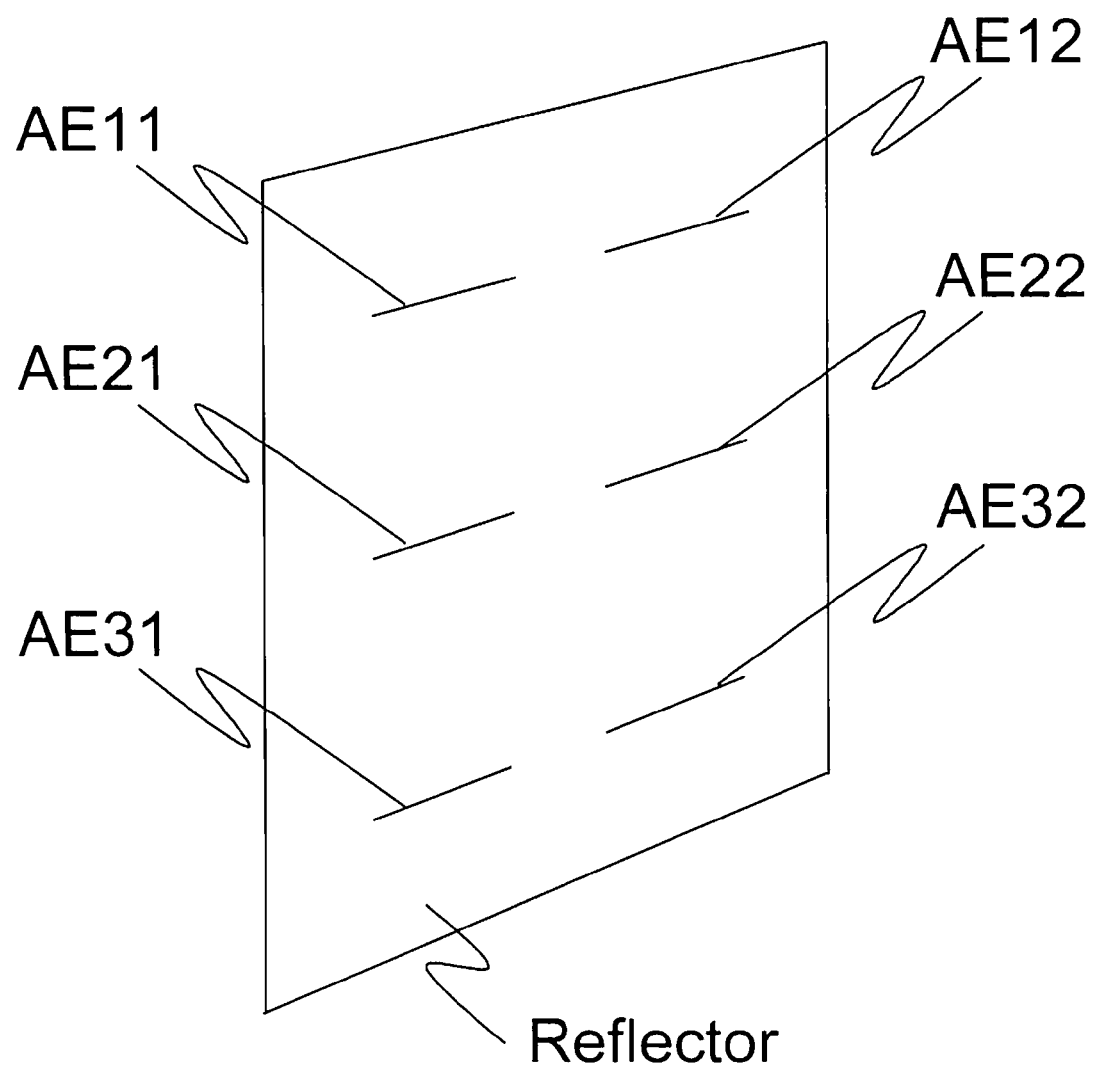
FIG. 4 shows an example antenna of a first embodiment of the invention with 6 antenna elements positioned in a rectangular grid in front of a reflector.

FIG. 4 shows an example antenna with six antenna elements <<AE11>>, <<AE21>>, <<AE31>>, <<AE12>>, <<AE22>>, <<AE32>>positioned in a rectangular grid in front of a reflector <<Reflector>>. The example antenna in FIG. 4 could be used as a donor antenna or a coverage antenna, a receiver antenna or a transmitter antenna. The number of antenna elements included in FIG. 4 is a non-limiting example useful for illustration. The number of antenna elements for the donor and coverage antennas need not be identical. Further, the antenna elements may be arranged in arrays or grids of various shapes as revealed in, e.g., International Patent Application WO2005062427.

When using array antennas composed of antenna elements positioned in an array configuration, it is common practice to adjust magnitudes, phase rotations or delays of signals fed to/from the various antenna elements such that a highly directional beam is achieved in the main direction of the antenna. This is known as weighting of the signals.

Figure 5:
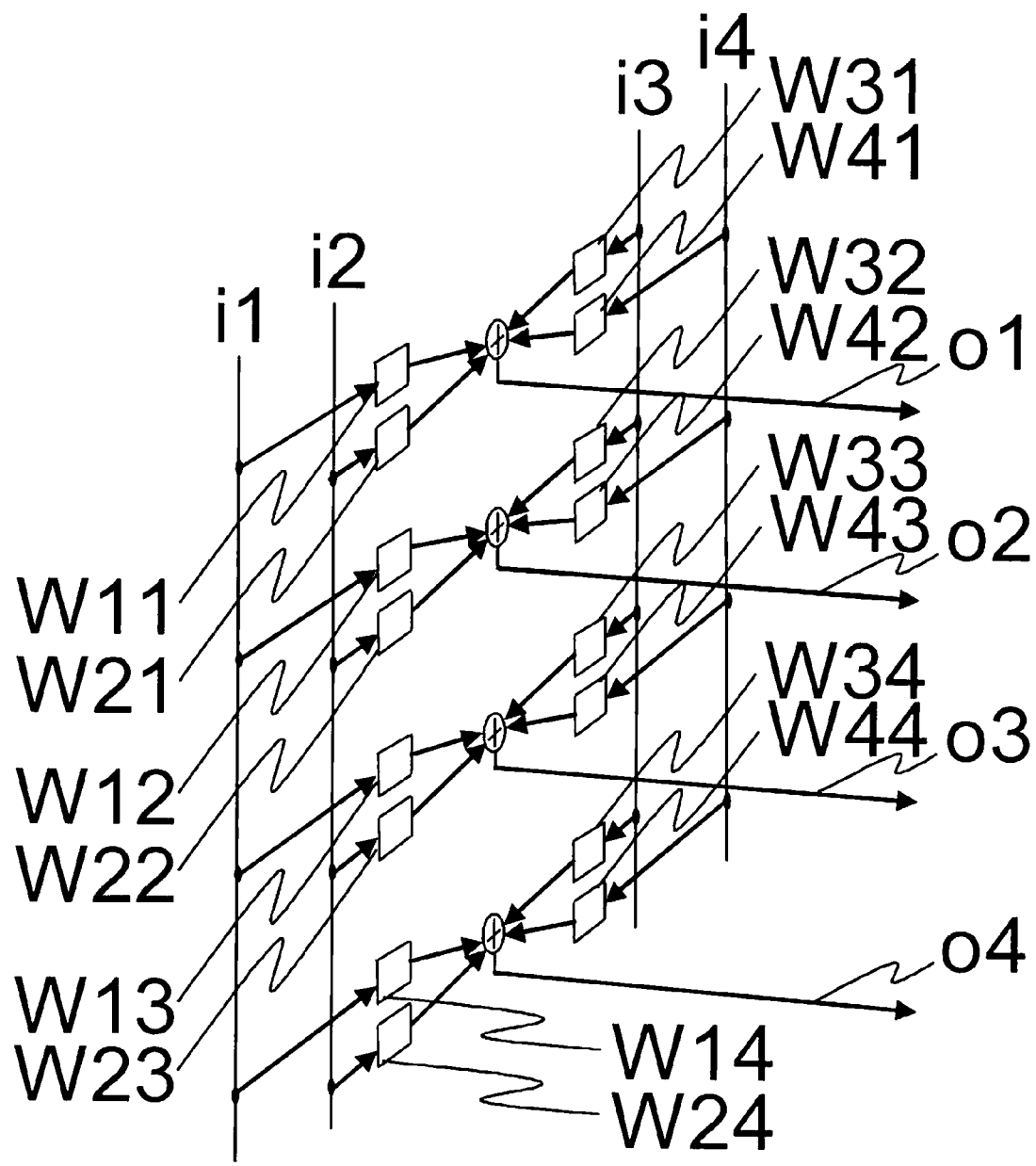
FIG. 5 schematically illustrates example weighting of signals fed to/from antenna elements according to the first embodiment of the invention.

According to the first embodiment of the invention, signals fed to a transmitting antenna or from a receiving antenna of the repeater station are weighted and possibly delayed and rotated as schematically illustrated in FIG. 5 for an example antenna with four antenna elements. The figure represents a weight matrix of complex valued weights, each weight corresponding to an amplifier, phase rotator and/or delay <<W11>>, <<W12>>, . . . <<W44>>, the arrangement weighting and combining signals which are input <<i1>>, <<i2>>, <<i3>>, <<i4>>, and outputting weighted and combined signals <<o1>>, <<o2>>, <<o3>>, <<o4>>.

A row or column vector of weights is also referred to as a weight matrix for a degenerate example weight matrix comprising a single row or a single column.

Figure 6:
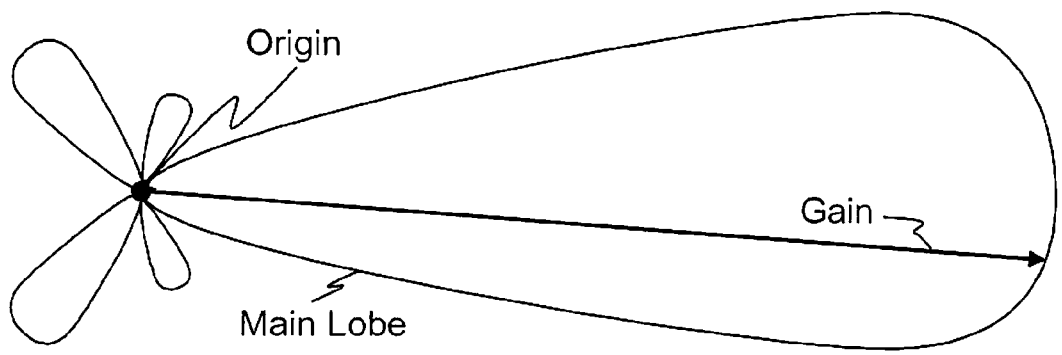
FIG. 6 demonstrates schematically a prior art antenna beam pattern of an example antenna.

FIG. 6 illustrates schematically an antenna beam pattern of an example individually tuned antenna with a great gain in the main lobe direction. Each lobe represents directional dependent gain <<Gain>> represented by the distance from an origin <<Origin>>, corresponding to the antenna location, and the periphery of the lobe as illustrated for one of the lobes <<Main Lobe>> by the length of an arrow <<Gain>> from the origin to the periphery of the lobe <<Main Lobe>>. The antenna may be used as a transmitter antenna or a receiver antenna. Due to the physical laws of reciprocity, the same directional properties normally apply to an antenna irrespective of whether it operates as a receiver antenna or as a transmitter antenna on the same frequency, with identical main lobe and side lobes for both operations.

However, when mounted in a repeater station, identical weights in both receiver and transmitter antenna, and identical antenna beam patterns, do not guarantee optimum isolation between the transmitter and receiver antennas of the repeater station. Individual optimization not considering the mounting may not guarantee minima for the particular individually determined weighting of the antennas to be in the desired direction of the installation with its particular mounting, location and coverage. An example situation illustrating some of the problems related to individual optimization is shown in FIG. 7.

Figure 7:
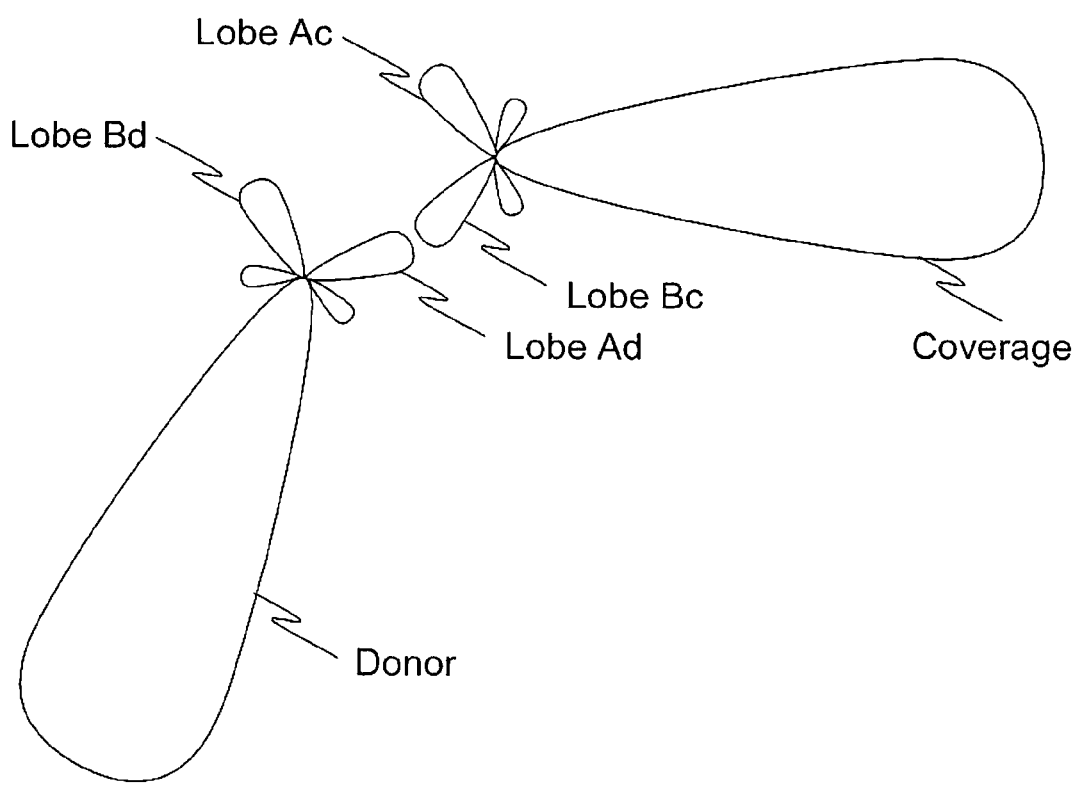
FIG. 7 illustrates an example prior art antenna beam patterns of an antenna installation at a repeater station with a donor and coverage antenna.

A donor antenna and coverage antenna mounted at a repeater station are illustrated in a top-view in FIG. 7. Both antennas have main lobes <<Coverage>>, <<Donor>>, each corresponding to the main lobe in FIG. 6. First, when not mounted back-to-back but in a mutual angle differing from 180°, as illustrated in FIG. 7, the antenna installation cannot fully utilize the front-to-back ratio of the individually optimized antennas. Second, corresponding side lobes, <<Lobe Ac>>, <<Lobe Bc>>, <<Lobe Ad>>, <<Lobe Bd>>, of the coverage and donor antennas become directed towards each other rotated or reflected such that a lobe <<Lobe Ad>> of the donor antenna becomes directed towards a lobe <<Lobe Bc>> of the coverage antenna not corresponding to the same lobe of the donor antenna. Consequently, even if the antenna isolation is substantially improved by reducing the gain of a lobe <>Lobe Bc>> of the coverage antenna in direction towards the donor antenna this could very well increase the antenna gain in another direction <<Lobe Ac>> being directed towards the coverage antenna, when applied to the donor antenna <<Lobe Ad>>.

According to the first embodiment of the invention, the repeater station preferably adjusts its transmit weights within a range of weights providing an upper limit of interfering feedback, thereby providing excellent antenna isolation.

According to the first embodiment of the invention, the weighting of received signals at the receiver antenna and the weighting of signals at the transmitter antenna of the repeater station are considered in a method and system providing weighting in relation to an overall improved isolation, superior to the overall isolation achieved by optimizing donor and coverage antennas individually.

The weighting is achieved by specifying a weight matrix for a channel from each antenna element of the transmitter antenna to each antenna element of the receiver antenna. Excellent antenna isolation can be achieved while preserving the rank of the overall channel from base station or access point to user equipment. However, to also achieve a satisfactory gain of the repeater station a corresponding channel matrix between base station and repeater station, and repeater station and user equipment is preferably considered.

The invention applies to separate transmitter and receiver antennas as explained above. The invention also applies to antenna installations combining the transmitter and receiver antennas in one unit.

Figure 8:
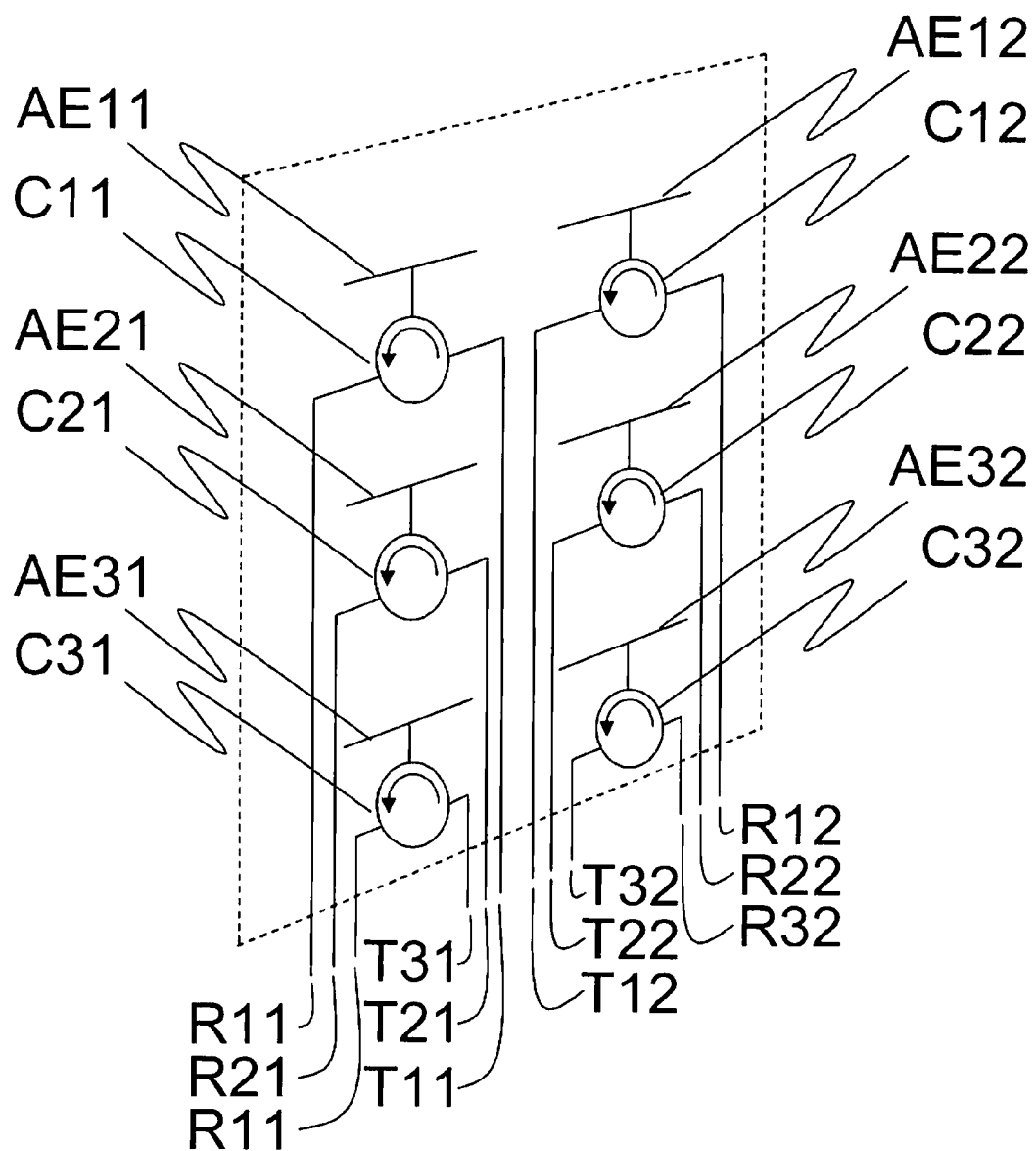
FIG. 8 illustrates a common donor and coverage antenna of a second embodiment of the invention.

Depending on the geographical location of the repeater station in relation to the base station and the coverage area of the repeater station, a common donor and coverage antenna, as illustrated in FIG. 8, is used in a second embodiment of the invention. The transmission directions are then separated using technology known in the art. The communications directions <<T>>, <<R>> can, e.g., be separated by means of circulators <<C11>>, <<C12>>, . . . <<C32>>. However, other duplexing circuitry than circulators, e.g., 3 dB hybrids or directional couplers are also applicable. According to the second embodiment of the invention, the communications directions are separated for each antenna element <<AE11>>, <<AE12>>, . . . <<AE32>> of the antenna and not only for the antenna elements combined. This however does not exclude that an antenna element is composed of a plurality of parts. If, e.g., the antenna element <<AE11>>, <<AE12>>, . . . <<AE32>> is a half-wave dipole, it is typically composed of two halves, each a quarter of the wave length for which it is designed. In an example realization separating communications directions by means of circulators <<C11>>, <<C12>>, . . . <<C32>>, there is then a circulator connected to each antenna element <<AE11>>, <<AE12>>, . . . <<AE32>> as illustrated in FIG. 8. The circulators are equipped with signal inputs for transmitting signals <<T11>>, <<T12>>, . . . <<T32>> and signal outputs for receiving signals <<R11>>, <<R12>>, . . . <<R32>> and each circulator <<C12>>, . . . <<C32>> is electrically connected to the antenna element <<AE12>>, . . . <<AE32>> for which it is arranged.

A third embodiment of the invention exploits the preserved rank of the communications links for MIMO communications from a casting entity, e.g., a base station, to a capturing entity, e.g., user equipment. For explanation of adaptation of radiation patterns and transmitter and receiver antennas of a repeater station through signal weighting, a transmitter weight matrix C and a receiver weight matrix A of the repeater station is defined for an example transmitter antenna with $N_T$ transmitter antenna elements and an example receiver antenna with $N_R$ receiver antenna elements. As explained for the first and second embodiments, the number of antenna elements of the transmitter and receiver antennas may be identical. However, this is not necessary. Also for the purpose of explanation, a channel matrix $H_0$, representing frequency domain channel transfer function from each of the transmitter antenna elements to the various receiver antenna elements of the receiver antenna of the repeater station, is defined. Thereby, the problem of optimizing the channel weights can to a great extent be translated to known solutions of optimizing transmissions between different transmitter and receiver stations using MIMO. However, for the repeater station the optimization concerns minimization of information transfer, whereas the known MIMO optimization concerns maximization of information transfer.

A trivial minimizing solution, minimizing the information transfer from the transmitter antenna to the receiver antenna of the repeater station would be to set all weights equal to zero. However, such a solution is non-interesting for information transfer from a casting entity, e.g., user equipment, to the capturing entity, e.g., a base station. For the purpose of explanation, also channel transfer matrices for the links to and from the repeater station from the base station and to the user equipment are defined. These channel transfer matrices are denoted $H_R$ and $H_T$, corresponding to channel transfer matrices for reception and transmission as seen from the repeater station.

To generalize the explanation, also matrices with scaling constants $H_A$, $H_{C1}$ and $H_{C2}$ are introduced representing phase rotations, delays and constant amplifications or attenuations in the repeater circuitry. A base station or user equipment operating as a transmitter may apply pre-distortion before transmitting the signal s. For the explanation to cover also this case, a pre-distortion matrix F is also allowed for in an example transmitting base station or user equipment. An example pre-distortion matrix, F, is a unitary matrix $V_R$ such that $V_R^H V_R = I$ (an identity matrix), where $V_R$ is determined from $$[U_R, S_R, V_R^H] = svd(H_R). \quad (1)$$

$V_R^H$ denotes the Hermitian transpose of desired matrix $V_R$ and svd(•) denotes the singular value decomposition.

Figure 9:
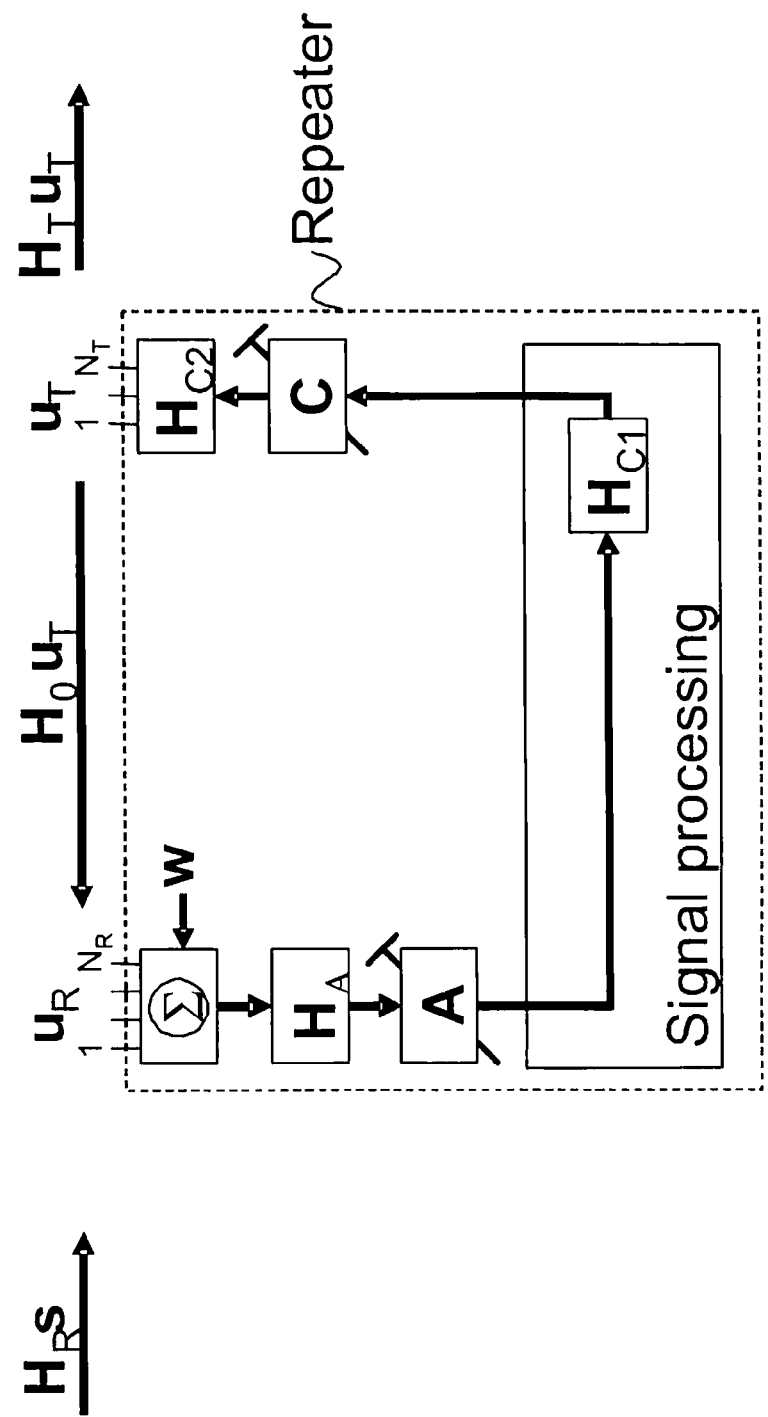
FIG. 9 includes a system model for explanation of the repeater-station operations in relation to a third embodiment of the invention, applicable in most parts also to other embodiments of the invention.

A system model for explanations of the repeater station operations in relation to the third embodiment of the invention is included in FIG. 9.

For each frequency of operations, f, or each angular frequency of operations, $\omega=2\pi f$, and using vector representation of signals, a receiving node (e.g., user equipment or a base station) receives a signal y $$y = H_T u_T + w_T, \quad (2)$$

where $w_T$ is additive noise in the receiving node as added in the transmission link from the repeater station and $u_T$ is the signal transmitted from the repeater station.

For reasons of simplicity and brevity, constant matrices $H_A$, $H_{C1}$, $H_{C2}$ can be incorporated in matrices A and C for the formal explanation, even if they are represented physically separated in a preferred example realization.

Assuming that weight matrices A and C can be optimized for total interference cancellation, thereby eliminating recursions, a signal processing signal r output from receiver weight matrix A is $$r = A(H_0 C r^{(1)} + w^{(2)}), \quad (3)$$

where $r^{(1)}$ is a help-vector representing the signal r in a situation where there is no feedback signal from the transmitter antenna to the receiver antenna of the repeater station to be compensated for, $$r^{(1)} = A(H_R F s + w^{(1)}). \quad (4)$$

(The terms $w^{(1)}$ and $w^{(2)}$ in (3) and (4) are the additive noise in the receiver of the repeater station.) In one realization of the third embodiment of the invention, the transmitter and receiver weight matrices A and C are determined separately, thereby substantially reducing complexity of the repeater station as compared to the weight matrices being determined jointly. The weight matrices are determined according to a particular criterion. The criterion is optionally a criterion selected at system setup.

Weight matrix A can, e.g., be determined according to an LMMSE (Linear Minimum Mean Square Error) optimization criterion, well-known in the art as such, thereby optimizing $r^{(1)}$ in accordance with the selected criterion.

Weight matrix A can, e.g., alternatively be determined to equal $U_R^H$, with $U_R$ determined from equation (1). In case a pre-distortion matrix F equals $V_R$ in equation (1), this combination of A and F would orthogonalize the channel $H_R$ on the receiver side of the repeater.

The antenna isolation is maximized if the transmitter weight matrix satisfies $$C \in null\{AH_0\}, \quad (5)$$

where $null\{AH_0\}$ denotes the null space of $AH_0$, $AH_0$ including the channel matrix $H_0$ multiplied by the receive matrix A. Then, $$AH_0 C = 0. \quad (6)$$

Consequently, any transmitter weight matrix C spanning the null space would provide excellent repeater station antenna isolation. In this context 0 indicates an all zero matrix, if C is a matrix, or an all zero column vector, if C is a column vector, corresponding to a degenerate matrix with one column. Preconditioning optimization of transmitter weight matrix C for the link to the capturing entity, provides a transmitter antenna weighting satisfying both substantial gain and excellent antenna isolation of the repeater station, while preserving the rank and rendering MIMO communications from the originating entity, e.g., base station, to the capturing entity, e.g., user equipment, viable as long as the number of MIMO sub channels in the transmitter link to the capturing entity is less than the rank of the null space of $AH_0$. Selected criterion for determining weight matrix C is preferably identical to the criterion for determining weight matrix A, e.g., LMMSE, thereby reducing implementation complexity and costs.

Figure 10:
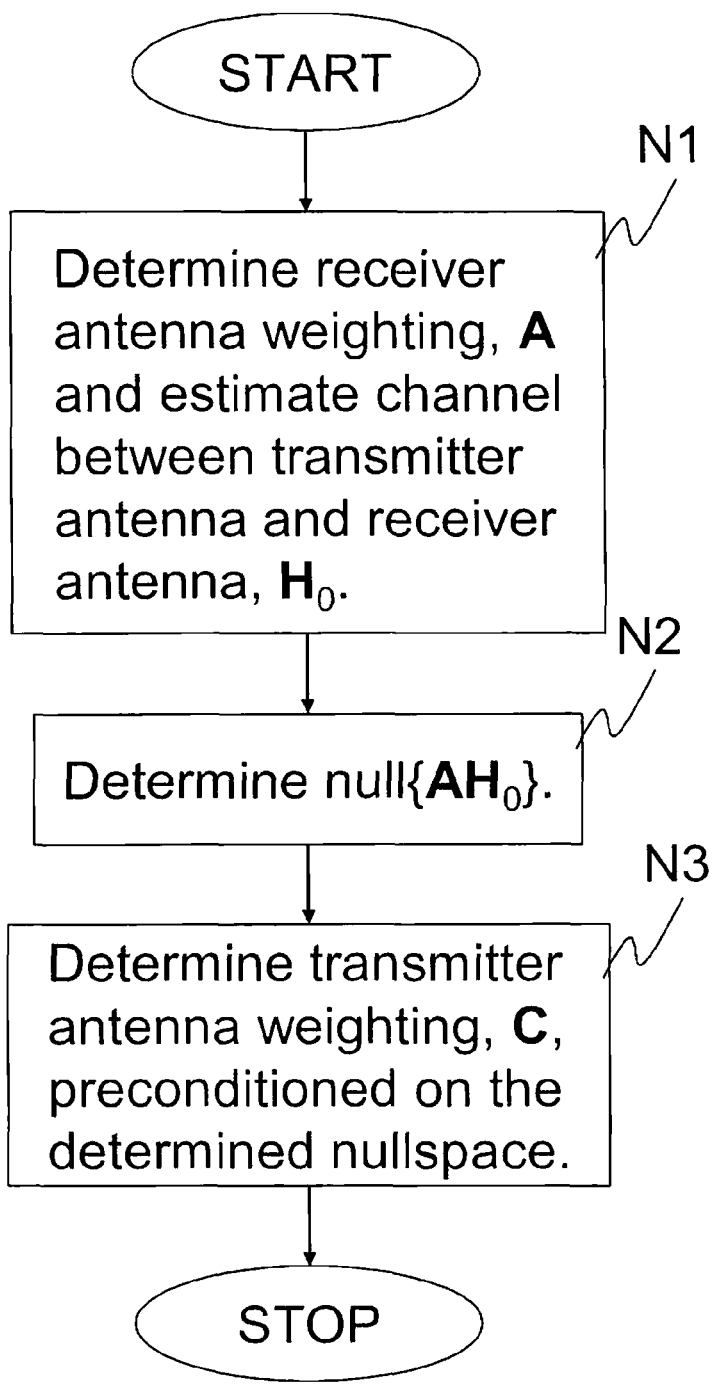
FIG. 10 illustrates schematically a flow chart for determining transmitter antenna weights according to the third embodiment of the invention.

FIG. 10 illustrates schematically a flow chart for determining transmitter antenna weights, such that the transmitter weight matrix is in the null space of $AH_0$, in accordance with equation (5). In a first step <<N1>>, antenna weighting is determined and feedback channel determined or approximated. Based on the results of the first step, the available null space of the receiver antenna weighting and feedback channel is determined next <<N2>>. Setting of transmitter antenna weight matrix in this null space, in the third step <<N3>>, results in a transmitter antenna weighting providing very good antenna isolation between the transmitter antenna and receiver antenna of the repeater station.

For MIMO communications with multiple data streams, a null space is defined for each data stream. Thereby, a particular weighting can be set for each data stream.

In a fourth embodiment of the invention, the limitations in relation to the rank of the null space of $AH_0$ are relaxed. The right-singular vectors of $H_0$, corresponding to zero singular values, form a basis for the null space of $H_0$. According to the fourth embodiment of the invention, a near-null space of $H_0$ is defined and preferably utilized for specifying viable transmitter weight matrices C. Analogously, a near-null space is defined and is preferably applied for specifying viable receiver weight matrix A, thereby further increasing the degrees of freedom and achieving excellent performance.

Adopting the principles of near-null space, equation (5) is rephrased as $$[U_{OA}, S, V_{OA}^H] = svd(AH_0), \quad (7)$$

$$C = V_{OA}(:,n:N_T), \quad (8)$$

where matrices $U_{OA}$, S and $V_{OA}^H$ are resulting matrices from a singular value decomposition of $AH_0$, $U_{OA}$ is a matrix comprising left-singular vectors of $AH_0$, S is a diagonal matrix of ordered singular values of $AH_0$ (the largest in the top left diagonal element, the second largest in the second diagonal element, etc.), and $V_{OA}^H$ denotes the Hermitian transpose of desired matrix $V_{OA}$, comprising right-singular vectors of $AH_0$. $V_{0A}(:,n:N_T)$ denotes the $N_T-n+1$ rightmost columns of $V_{0A}$ (including all rows) where n is a variable determining the number of singular values considered to be near null. In other words, the feedback interference increases when n decreases, and should be tuned in relation to desired gain in forward direction. The number of columns, $N_T-n+1$, selected from $V_{0A}$ by the choice of n, is preferably selected in relation to the magnitude of the singular values. The magnitude considered is either an absolute value of the singular value or a relative magnitude, normalized to a reference value corresponding to the singular value of greatest magnitude. This reference value is the value of greatest magnitude on the diagonal of matrix S.

The fourth embodiment provides at most $N_T-n+1$ MIMO sub channels to be received and forwarded by the repeater. In the end, the number of MIMO sub-channels will depend on the amplification of the repeater and the antenna gain in forward direction.

Figure 11:
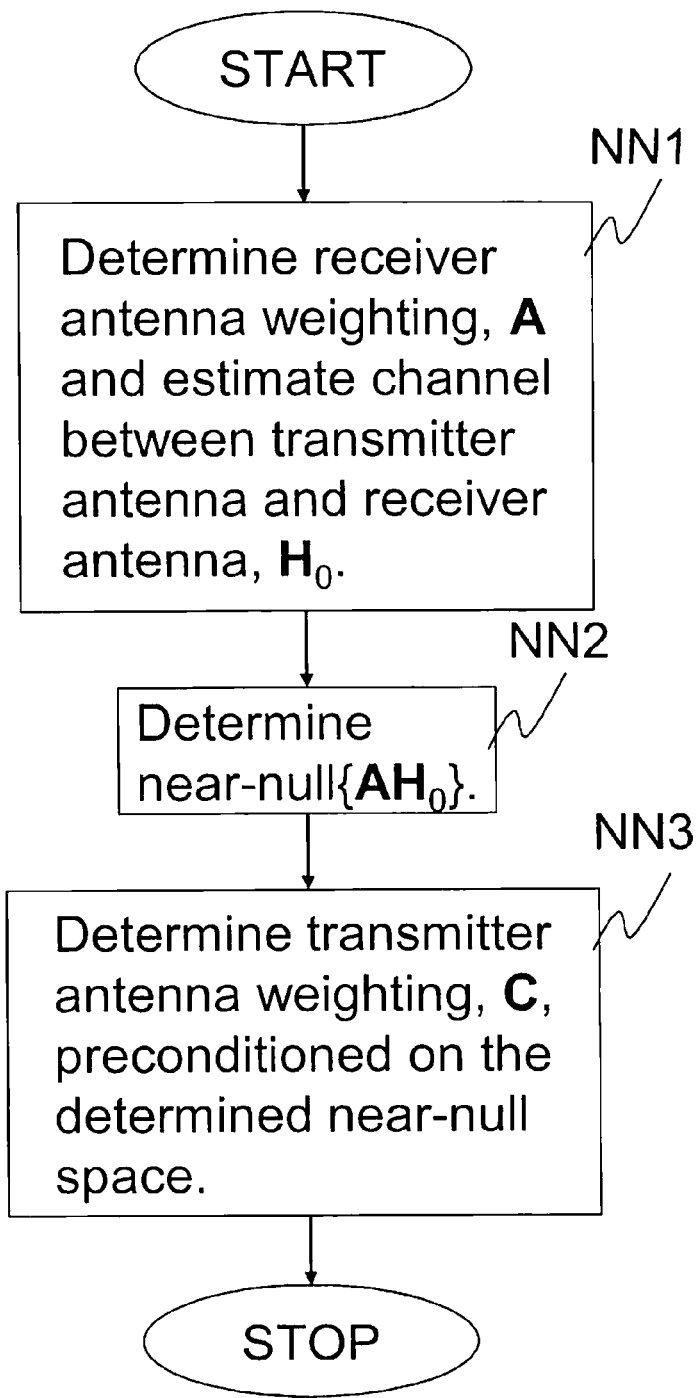
FIG. 11 illustrates a simplified flowchart for determining transmitter antenna weights achieved from the principles of near-null space according to a fourth embodiment of the invention.

FIG. 11 illustrates a simplified flowchart for determining transmitter antenna weights achieved from the principles of near-null space. In a first step <<NN1>>, antenna weighting is determined and feedback channel estimated. Based on the results of the first step, the available near null space of the receiver antenna weighting and feedback channel is determined <<NN2>> preferably using singular value decomposition of $AH_0$. Transmitter antenna weighting set in this near-null space in the third step <<NN3>> results in a transmitter antenna weighting providing good antenna isolation between the transmitter antenna and receiver antenna of the repeater station. The isolation depends on leakage allowed when determining the near-null space.

In a fifth embodiment of the invention both receiver and transmitter antenna weights are set for control of interference from transmitter to receiver of a repeater station.

In direct correspondence to the third embodiment, the null space is utilized, and both receiver antenna and transmitter antenna weights of the repeater are determined for the weight matrices to be in the left and right null spaces of $H_0$ respectively, $$A^H \epsilon \text{null}\{H_0^H\}, \quad (9)$$

$$C \epsilon \text{null}\{H_0\}, \quad (10)$$

such that $$AH_0=0, \text{ and} \quad (11)$$

$$H_0C=0, \quad (12)$$

i.e., for each row of $(A)_i$ of A, $(A)_i H_0=0$ (a vector of zeros), and for each column $(C)_j$ of C, $H_0(C)_j=0$ (a vector of zeros).

Figure 12:
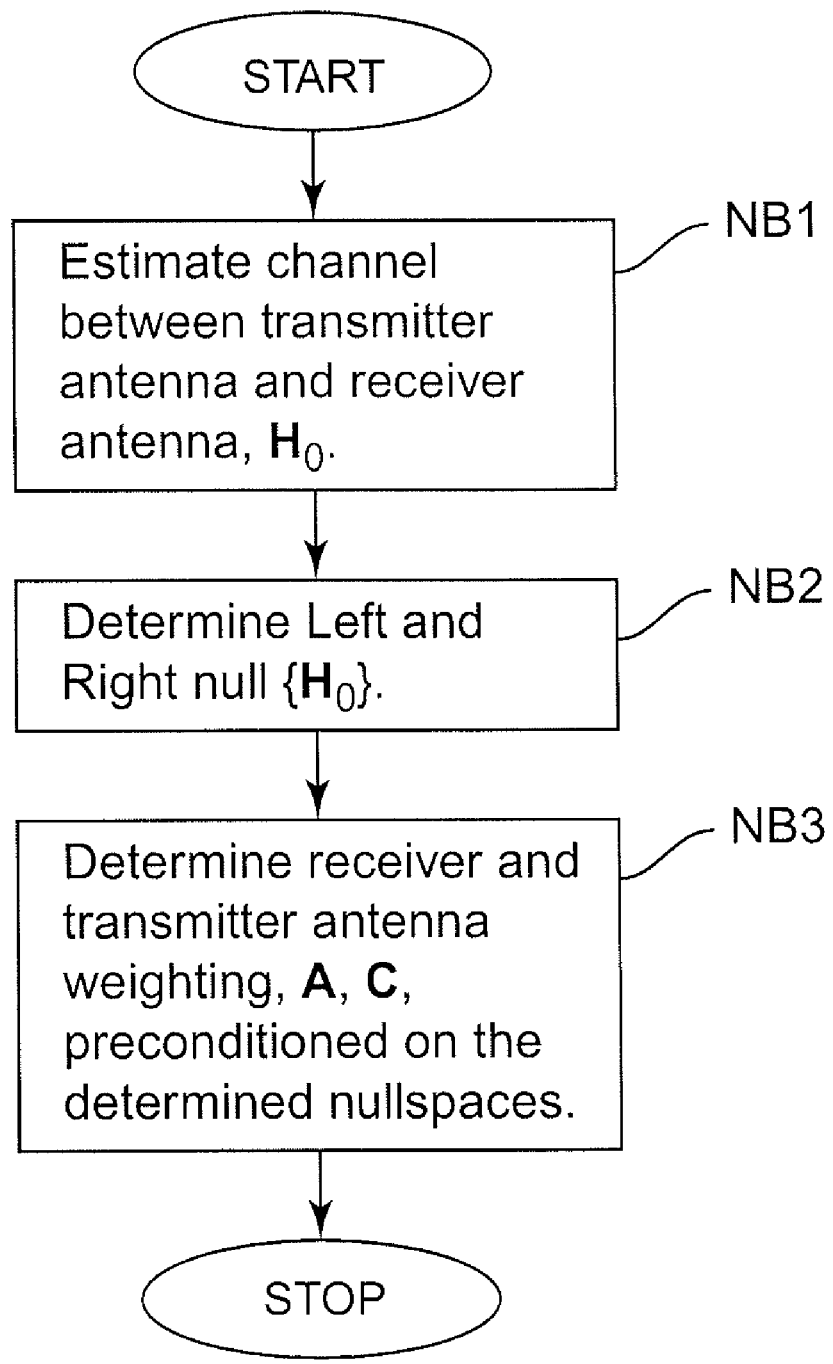
FIG. 12 illustrates schematically in a flow chart weight allocation in accordance with a fifth embodiment of the invention.

To stress the symmetry between the fifth and third embodiments of the invention, $H_0$ can be seen as the result of a multiplication of an identity matrix with the feedback channel matrix, $H_0$, itself. A flow chart in FIG. 12 illustrates schematically weight allocation in accordance with the fifth embodiment of the invention. In a first step <<NB1>>, feedback channel from the transmitter antenna to the receiver antenna of the repeater station is determined or approximated. Based on the results of the first step, the available null space of the receiver feedback channel is determined <<NB2>>. Receiver and transmitter antenna weighting is set in this null space in a third step <<NB3>>.

A sixth embodiment of the invention combines the achievements of the fifth and fourth embodiments defining a near-null space of the feedback channel $H_0$, using singular value decomposition of the channel matrix $H_0$. The results achieved in equation 7 then translates to $$[U_0, S_0, V_0^H{}_0]=svd(H_0), \quad (13)$$

where now matrices $U_0$, $S_0$ and $V_0^H$ are resulting matrices from a singular value decomposition of $H_0$. $U_0$ is a matrix comprising left-singular vectors of $H_0$. $S_0$ is a diagonal matrix of singular values of $H_0$, and $V_0^H$ denotes the Hermitian transpose of desired matrix $V_0$, comprising right-singular vectors of $H_0$.

$$C=V_0(:,n:N_T), \quad (14)$$

$$A=(U_0(:,n:N_R))^H, \quad (15)$$

where $V_0(:,n:N_T)$ denotes the $N_T-n+1$ rightmost columns of $V_0$, $(U_0(:,n:N_R))^H$ denotes the $N_R-n+1$ rightmost columns of $U_0$ and $(\bullet)^H$ denotes Hermitian transpose. As before, n is a variable determining the number of non-zero values considered to be near null. In other words, the feedback interference increases when n decreases and should be tuned in relation to desired or achieved gain in forward direction. The number of columns, $N_T-n+1$, of $V_0$ is preferably selected in relation to the magnitude of the singular values. The magnitude considered is either an absolute value of the singular value or a relative magnitude, normalized to a reference value equal to the singular value of greatest magnitude. This reference value is the value of greatest magnitude on the diagonal of matrix $S_0$.

Figure 13:
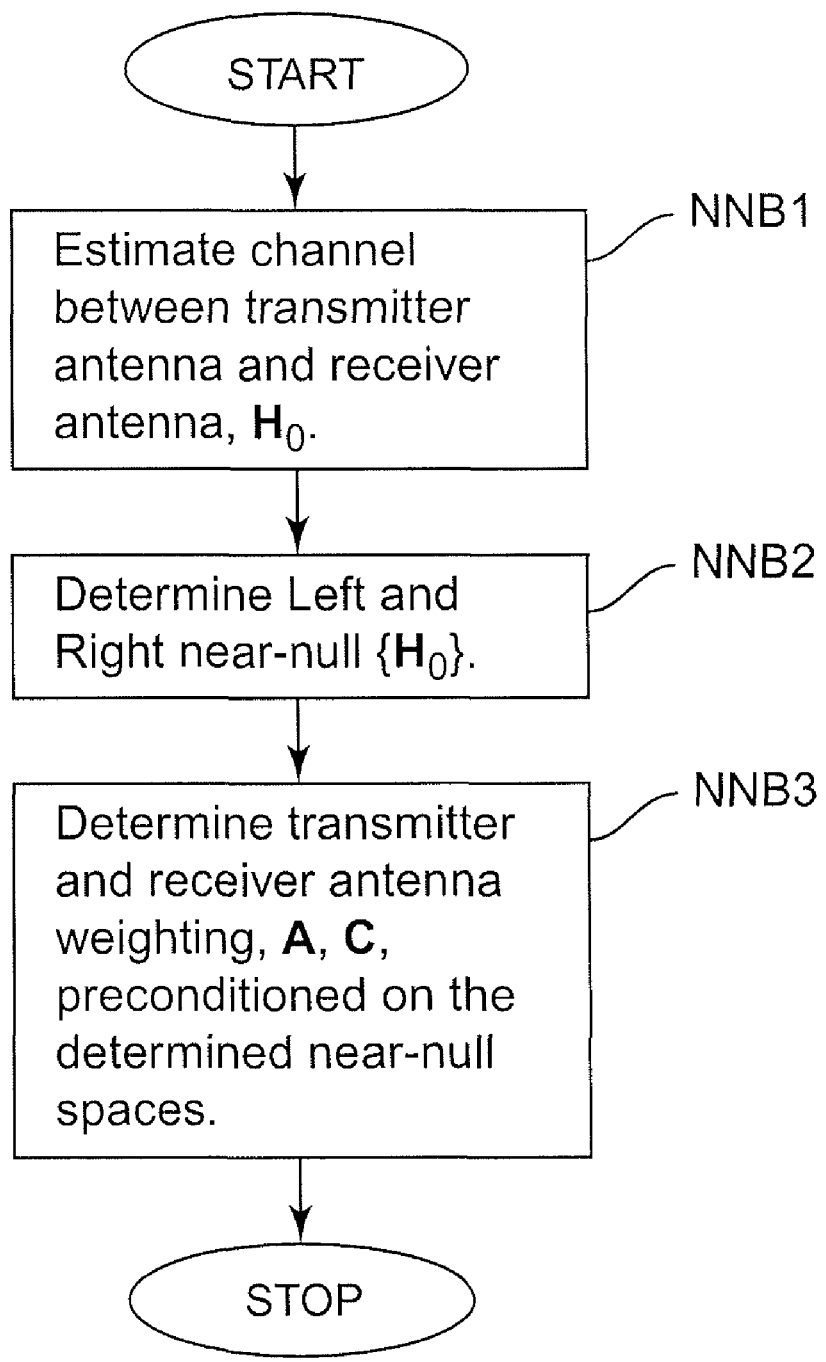
FIG. 13 illustrates a simplified flowchart for determining of transmitter and receiver antenna weights achieved from the principles of near-null space according to a sixth embodiment of the invention.

FIG. 13 illustrates a simplified flowchart for determining of transmitter and receiver antenna weights achieved from the principles of near-null space. In a first step <<NNB1>>, the feedback channel from transmitter antenna to receiver antenna of the repeater station is estimated. Based on the results of the first step, the available near null space of the feedback channel is determined <<NNB2>> preferably using singular value decomposition of $H_0$. Transmitter and receiver antenna weighting set in this near-null space in the third step <<NNB3>> results in a transmitter antenna weighting providing good antenna isolation between the transmitter antenna and receiver antenna of the repeater station. The antenna isolation depends on leakage allowed by choice of variable n when determining the near-null space.

Figure 14:
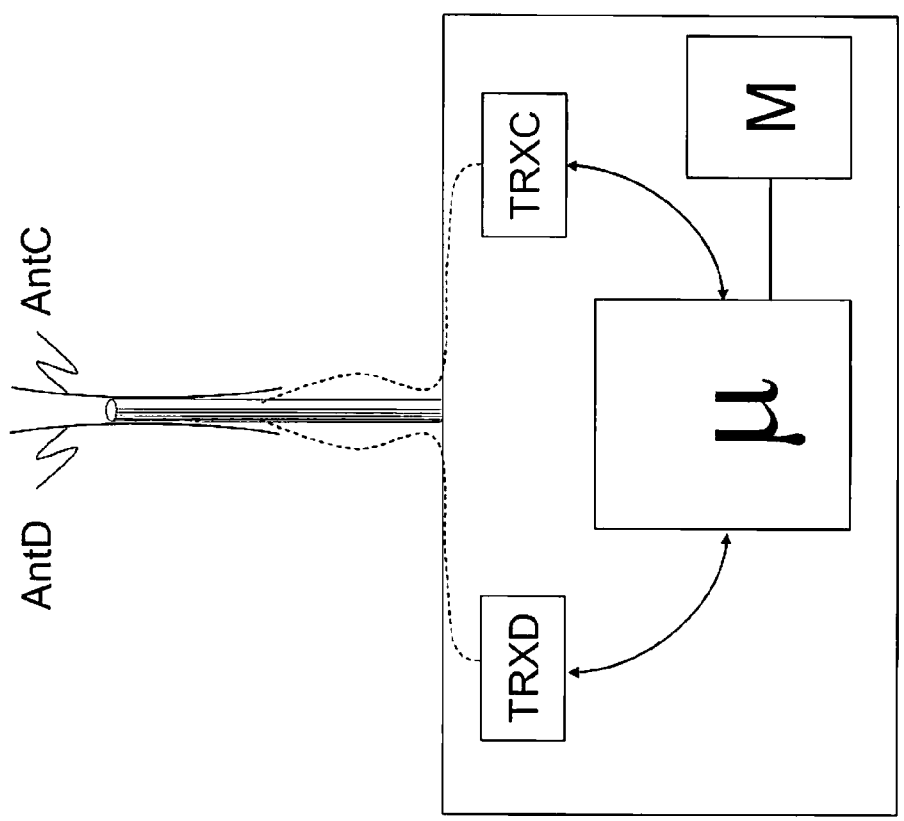
FIG. 14 illustrates a simplified block diagram of a repeater station according to the invention.

FIG. 14 illustrates a simplified block diagram of a repeater station according to the invention. A processing entity <<μ>> is responsible for example channel estimation of the channel from transmitter antenna to the receiver antenna. Channel parameters are optionally stored in storage or memory means <<M>> connected to or included with the processing means <<μ>>. The repeater station is illustrated to include two antennas, a donor antenna and a coverage antenna <<AntD>>, <<AntC>>, both of which operate as transmitter and receiver antennas. As mentioned above the donor and coverage antennas, <<AntD>>, <<AntC>> may be integrated into one antenna construction. The invention is applicable to, e.g., planar, curved or tilted antennas, as best satisfies desired communication properties. The donor and coverage antennas are connected to transmitter and receiver means <<TRXD>>, <<TRXC>> responsible for radio frequency reception and transmission. In accordance with the invention, the radio circuitry of the transmitter and receiver means may be integrated into one unit or may be separated. Also in accordance with the invention, the transceiver means feeding or receiving signals to/from the various antennas can also be standalone units for the respective antennas, or be integrated into one unit.

In relation to the weight elements illustrated in FIG. 5, the weight elements are preferably integrated in the transceiver means, <<TRXD>>, <<TRXC>>. The transceiver means interchange information with processing means <<μ>>, among other things for determining the appropriate weights.

A person skilled in the art readily understands that the receiver and transmitter properties of, e.g., a base station or user equipment are general in nature. The use of concepts, such as MIMO and LMMSE, within this patent application is not intended to limit the invention only to devices associated with these acronyms or concepts. It concerns all devices operating correspondingly, or being obvious to adapt thereto by a person skilled in the art.

The invention is not intended to be limited only to the embodiments described in detail above. Changes and modifications may be made without departing from the invention. It covers all modifications within the scope of the following claims.

The invention claimed is:

1. A method of interference mitigation for a repeater station, the repeater station comprising at least one antenna with two or more antenna elements with which the repeater station is configured to communicate signals wirelessly, said method comprising:
   determining a channel representation of a feedback channel from an output connection of the repeater station to an input connection of the repeater station, wherein the channel representation comprises a channel matrix of matrix elements, and wherein the feedback channel is represented by a transfer function or impulse response corresponding to various antenna elements of the at least one antenna;
   setting weights for the various antenna elements based upon the channel representation, to suppress signal transfer from the output connection to the input connection of the repeater station, said weights being amplifying or delaying signals to or from the various antenna elements, to suppress signal transfer from the output connection to the input connection of the repeater equipment; and
   wherein the weights are determined to correspond to: elements of a weight matrix in the null space of the matrix representation of the feedback channel; or elements of a weight matrix in the null space of the matrix representation of the feedback channel multiplied by a predetermined receive matrix; or elements of a matrix in a predefined extension of the null space of the matrix representation of the feedback channel, the predefined extension being determined by a number representing a particular number of singular vectors achieved from a singular value decomposition of the matrix representing the feedback channel; or elements of a matrix in a predefined extension of the null space of the feedback channel multiplied by a predetermined receive matrix, the predefined extension being determined by a number representing a particular number of singular vectors achieved from a singular value decomposition of the matrix representing the feedback channel multiplied by a predetermined receive matrix; and
   further wherein said weights are determined so that the rank of the communications channel provided by the repeater station is greater than one.

2. The method of claim 1, wherein the weights are determined to correspond to elements of a weight matrix in the null space of the matrix representation of the feedback channel multiplied by a predetermined receive matrix, and wherein the weights are determined so that the rank of the null space of the feedback channel multiplied by the predetermined receive matrix is greater than a number representing a desired number of MIMO subchannels; or
   wherein the weights are determined to correspond to elements of a weight matrix in the null space of the matrix representation of the feedback channel, and wherein the weights are determined so that the rank of the null space of the feedback channel is greater than a number representing a desired number of MIMO subchannels.

3. The method of claim 1, wherein the weights are determined to correspond to elements of a matrix in a predefined extension of the null space of the matrix representation of the feedback channel, or of the matrix representation of the feedback channel multiplied by a predetermined receive matrix, wherein the number representing the particular number of singular vectors achieved from a singular value decomposition is predetermined in a manner so that the number representing the particular number of singular vectors is smaller than the number of transmitting antennas of the repeater incremented by one minus a number of desired MIMO subchannels.

4. The method of claim 1, wherein the weights for both transmission and reception are set based upon the channel representation.

5. The method of claim 1, wherein the two or more antenna elements are used for both transmission and reception.

6. The method of claim 5, wherein transmission and reception signals are separated by means of a circulator for each antenna element.

7. The method of claim 1, wherein the signals communicated wirelessly are signals for MIMO communications.

8. The method of claim 7, wherein the weights determined for the various antenna elements provide spatial multiplexing.

9. A repeater equipment for a repeater station for wireless communications, said repeater station comprising at least one antenna with two or more antenna elements with which the repeater station is configured to communicate signals wirelessly, and said repeater equipment comprising one or more processing circuits configured to:
   determine a channel representation of a feedback channel from an output connection of the repeater station to an input connection of the repeater station, wherein the channel representation comprises a channel matrix of matrix elements, and wherein the feedback channel is represented by a transfer function or impulse response corresponding to various antenna elements of the at least one antenna; and
   set weights for the various antenna elements based upon the channel representation, to suppress signal transfer from the output connection to the input connection of the repeater station, said weights being amplifying or delaying signals to or from the various antenna elements; and
   wherein said one or more processing circuits are configured to set the weights so that the weight elements correspond to: elements of a weight matrix in the null space of the matrix representation of the feedback channel; or elements of a weight matrix in the null space of the matrix representation of the feedback channel multiplied by a predetermined receive matrix; or elements of a matrix in a predefined extension of the null space of the matrix representation of the feedback channel, wherein the one or more processing circuits are configured for determining the predefined extension by a number representing a particular number of singular vectors achieved from a singular value decomposition of the matrix representation of the feedback channel; or elements of a matrix in a predefined extension of the null space of the matrix representation of the feedback channel multiplied by a predetermined receive matrix, wherein the one or more processing circuits are configured for determining the predefined extension by a number representing a particular number of singular vectors achieved from a singular value decomposition of the matrix representation of the feedback channel multiplied by the predetermined receive matrix; and further wherein the one or more processing circuits are configured to set the weights so that the rank of the communications channel provided by the repeater station is greater than one.

10. The repeater equipment of claim 9, wherein the one or more processing circuits are configured for setting the weights to correspond to elements of a weight matrix in the null space of the matrix representation of the feedback channel multiplied by a predetermined receive matrix, and wherein the one or more processing circuits are configured for setting the weights so that the rank of the null space of the feedback channel multiplied by the predetermined receive matrix is greater than a number representing a desired number of MIMO subchannels; or wherein the one or more processing circuits are configured for setting the weights to correspond to elements of a weight matrix in the null space of the matrix representation of the feedback channel, and wherein the one or more processing circuits are configured for setting the weights so that the rank of the null space of the feedback channel is greater than a number representing a desired number of MIMO subchannels.

11. The repeater equipment of claim 9, wherein the one or more processing circuits are configured for setting the weights to correspond to elements of a matrix in a predefined extension of the null space of the matrix representation of the feedback channel, or of the matrix representation of the feedback channel multiplied by a predetermined receive matrix, wherein the one or more processing circuits are configured for predetermining the number representing the particular number of singular vectors achieved from a singular value decomposition in a manner so that the number representing the particular number of singular vectors is smaller than the number of transmitting antennas of the repeater incremented by one minus a number of desired MIMO subchannels.

12. The repeater equipment of claim 9, wherein the one or more processing circuits are configured for determining the representation of the feedback channel from the output connection of the repeater station to the input connection of the repeater station, wherein the feedback channel representation corresponds to various antenna elements of the at least one antenna.

13. The repeater equipment of claim 9, wherein the one or more processing circuits are configured for setting weights for both transmission and reception based upon the channel representation.

14. The repeater equipment of claim 9, wherein the repeater station includes transceiver circuits comprising duplexing circuitry for use of at least one antenna element for both transmission and reception.

15. The repeater equipment of claim 9, wherein the duplexing circuitry comprises one or more circulators.

16. The repeater equipment of claim 9, wherein the duplexing circuitry comprises one or more 3-dB hybrids.

17. The repeater equipment of claim 9, wherein the wireless communications are MIMO communications.

18. The repeater equipment of claim 17, wherein the one or more processing circuits are configured to provide spatial multiplexing.

* * * * *